Dec. 24, 1957 G. V. SLOTTMAN 2,817,611

METHOD AND APPARATUS FOR THE THERMOCHEMICAL DESURFACING OF FERROUS METAL BODIES

Filed March 19, 1954 2 Sheets-Sheet 1

INVENTOR
GEORGE V. SLOTTMAN

BY H. Hume Mathews
ATTORNEY

INVENTOR
GEORGE V. SLOTTMAN
BY H. Hume Mathews
ATTORNEY

Dec. 24, 1957  G. V. SLOTTMAN  2,817,611
METHOD AND APPARATUS FOR THE THERMOCHEMICAL DESURFACING
OF FERROUS METAL BODIES
Filed March 19, 1954  2 Sheets-Sheet 2

INVENTOR
BY
ATTORNEY

United States Patent Office 2,817,611

Patented Dec. 24, 1957

2,817,611

METHOD AND APPARATUS FOR THE THERMOCHEMICAL DESURFACING OF FERROUS METAL BODIES

George V. Slottman, New York, N. Y., assignor to Air Reduction Company, Incorporated, New York, N. Y., a corporation of New York Application March 19, 1954, Serial No. 417,421

11 Claims. (Cl. 148—9.5)

This invention relates to the scarfing of ferrous metal bodies such as steel blooms or strips and more particularly to scarfing in steel mills where such ferrous bodies are processed successively at high speeds and frequent intervals.

In recent years, the method of scarfing which is based on the use of oxygen to remove undesirable surface portions of ferrous objects has been developed and improved. The desurfacing or the thermochemical removing phase of the scarfing is accomplished by moving lengthwise the bloom, for instance, through the opening formed by a set of desurfacing heads or burners from which oxygen issues and impinges at an angle on the surfaces of the bloom. Prior to the desurfacing, a required preheating phase is effected so that the oxidation of the ferrous surface can be initiated. The leading end surfaces of the ferrous bodies are customarily preheated by oxy-acetylene flames until the steel reaches its kindling temperature and then, as mentioned, gaseous oxygen is impinged at an angle with the result that a surface layer is removed due to oxidation. In conventional practice the ferrous body is stopped, after passing through a rolling device; and the preheating is effected. Thereafter, the bloom is moved past the scarfing burners. This stop-start mode of operation obviously is not the most desirable for use in a high speed steel mill where the blooms move rapidly between rolling devices and at frequent intervals of time.

It is the primary object of the instant invention to provide an improved method and apparatus for use in high speed steel mills whereby the scarfing of a succession of ferrous bodies can be effected at high speeds without stopping each of the ferrous bodies for the step of preheating.

This object is accomplished in the instant invention by effecting the required preheating while the bloom or other ferrous body moves forward continuously, at a speed which at least approaches the high speed at which it is being moved after the prior treating operation. In this manner scarfing is done without stopping the bloom and a continuous succession of blooms are obtained at a high-speed production rate. As a consequence, the disadvantage, encountered in prior practice, of the scarfing operation being a limiting factor on the mill schedule due to the time required for stopping, positioning, and preheating the bloom, is avoided.

In general, the disclosed, preferred structural embodiment of the invention is comprised of movable reciprocating means for preheating the leading end of a bloom, preparatory for desurfacing, while it moves rapidly, substantially at high mill speed. This means is provided by a reciprocating scarfing carriage which moves between two sections of mill roll table. The carriage has clamp means for holding the bloom and positioning the forward part of the bloom in relation to the burners and also has structure both for supporting the remainder of the bloom during preheating and for supporting and moving it forward during desurfacing. A control system is also provided for operating the entire scarfing installation on an automatic cycle.

Other objects, along with the features and advantages of the invention will be apparent from the following detailed description and the drawing of the preferred embodiment of the instant invention, in which.

Figure 1:
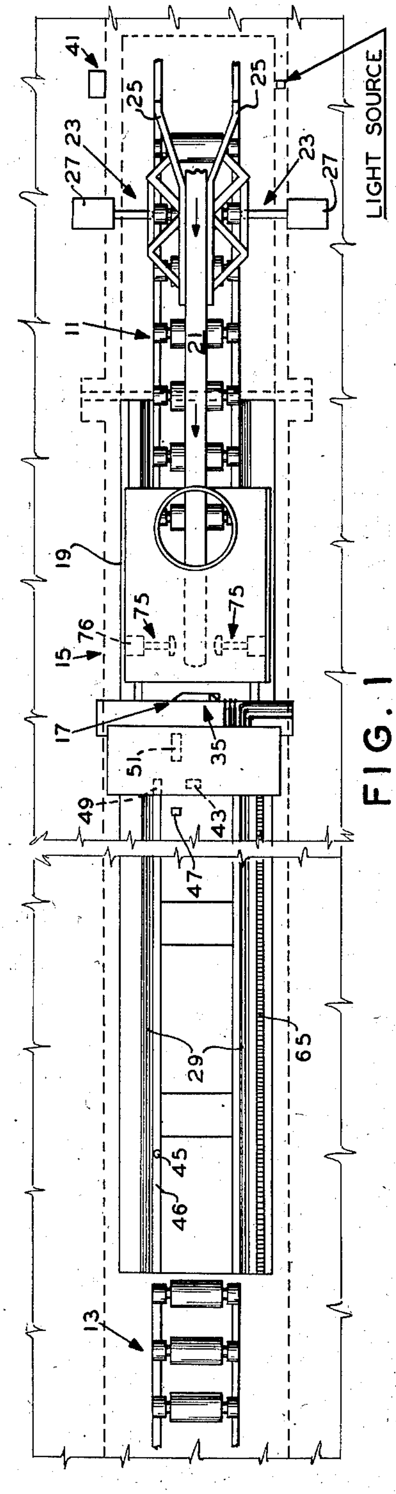
Fig. 1 is a broken top view, and shows the scarfing installation which includes an entry mill roll table, a scarfing zone and an exit mill roll table.

In the Figure 1 top view of the preferred scarfing installation embodying the instant invention, it can be seen that a scarfing zone is defined by an entry mill roll table 11 and an exit mill roll table 13. Both of these sections of the mill roll table have conventional means (not shown) for moving the rolls and hence propelling the bloom from a processing apparatus to the scarfing zone and thereafter to the next processing apparatus. The reciprocating scarfing carriage 15, having a burner section 17 and smoke hood 19, is positioned near the delivery end of the entry mill roll table. Bloom 21 is shown partially within the smoke hood 19, with the remainder of the bloom being supported on the entry mill roll table 11. As shown, the rear portion of the bloom is appropriately guided towards other means for positioning the bloom by two adjustable guide devices 23. These guide devices as shown, in part, schematically and basically are comprised of guide rails 25 and guide operating motors 27. In the part of the scarfing zone, forward of the carriage 15, the track 29 for supporting the scarfing carriage appears and it can be observed that it is the innermost longitudinally extending structure. Suitable flexible means (not shown) are also provided for supplying oxygen and a combustible gas, such as acetylene, to conduits leading to the burner section 17 of the carriage without interference with the forward and rearward movement of the carriage.

Figure 2:
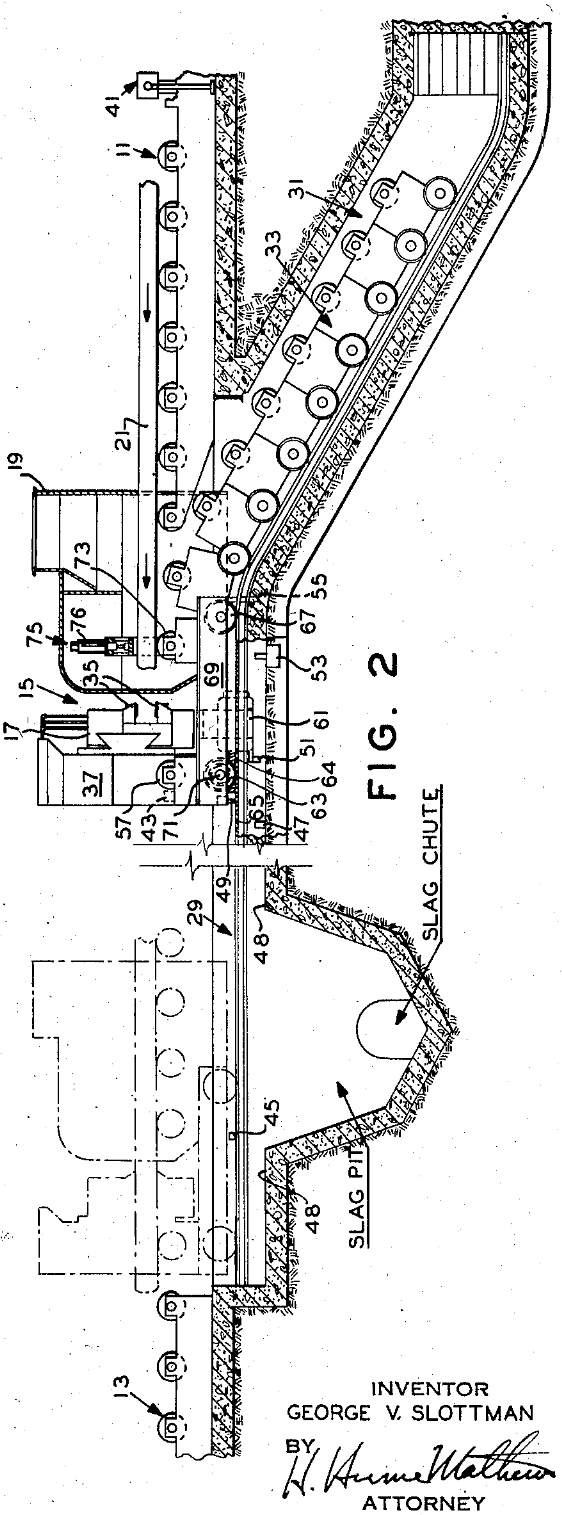
Fig. 2 is a side elevation, partly in cross section, of the Fig. 1 installation and shows more clearly the reciprocable scarfing machine with its train of roll buggies, positioned adjacent the entry mill roll table.

Referring now to the Figure 2 side elevation showing, it can be seen that the two mill roll tables 11, 13 are in the same horizontal plane and that the level of the track 29 is below that of the tables. The guide devices 23 have been omitted from the Figure 2 showing in the interests of clarity, as have other parts which will be pointed out hereinafter. A slag pit having a slag removal chute is forward of the carriage and this structure is identified by legends of the drawing. Below the forward part of the entry mill roll table 11, a tunnel 31 is provided for the train of roll buggies 33 which are attached to the rear of the scarfing carriage 15. It should be noted that the scarfing carriage 15 is shown in its desurfacing position near the exit mill roll table 13 by means of a dashed-line outline.

The scarfing machine 15 has four burners 35 of conventional design, each having preheat means, oxygen desurfacing means and positioning motors. The side burners which would be in front of and behind the bloom have been omitted from Figure 2 in the interests of clarity, as have other associated structures. The burners 35 and cooperating structure, such as valves and positioning motors are constructed in accordance with the well-known designs of devices, used in the art, for simultaneously oxy-acetylene scarfing of all four surfaces of a bloom or the surfaces of other similar bodies. The burner and associated structure, shown in the U. S. Patent No. 2,351,653, issued to J. L. Anderson on June 20, 1944, is readily adapted for use in the instant machine. The scarfing machine has pilot light means (not shown) which provides the means for igniting the oxy-combustible gas mixture issuing from the preheat orifices at the beginning of each cycle. Since the details of the burner structure per se form no part of the instant invention, such details have not been shown and will not be described. It is sufficient to realize that each burner has preheat oxy-acetylene orifices which serve to bring the leading edges of the steel bloom up to kindling temperature for initiating the desurfacing; and thereafter, to provide the heat for conditioning the unscarfed bloom surface, adjacent to where the oxygen and iron are oxidizing, so as to be suitable for scarfing when the angled jets of oxygen impinge on the heated unscarfed surface of the bloom. Burner motors (not shown in Figures 1 and 2 but hereinafter mentioned) which are electrically or otherwise operated, are also provided for positioning the burners properly in relation to the bloom. The scarfing machine has a control box 37 containing devices which, in cooperation with other control apparatus in the installation, provide for burner positioning and for supplying the acetylene and oxygen in a suitable manner through solenoid valves (not shown). The control system and some of the controlled apparatus will be described in more detail with reference to Figure 5.

The location of certain control items can be noted at this point with reference to Figures 1 and 2. An electric eye device 41 is positioned so as to be responsive to the passage of a bloom over the entry mill roll table 11. There is a bloom contact switch device 43 having a normally-horizontally-positioned lever mounted on the scarfing machine 15 below the control box 37 and this device 43 functions in response to the passage of a bloom through the scarfing machine. Two other control items are the forward tripper 45 in the forward upper part 46 of carriage track bed (see Figure 1) and the rear tripper 47 which is positioned in the bottom part 48 of the track bed off-center under the scarfing carriage. See Figures 2 and 3. These two trippers serve to trip and then to reset at appropriate times two switch devices 49, 51 of conventional design, depending, at upper and lower levels, from the forward part of the scarfing carriage 15. The remaining control item which should be noted at this point is the cycle reset switch 53 which is positioned in the bottom part 48 or trough of the track bed beneath the carriage. This conventional, cycle reset switch 53 is tripped and reset by the carriage tripper 55, mounted on the rear of the carriage, upon rearward movement of the carriage, so that the control system is set for a complete cycle when an unscarfed bloom moves into the installation.

Below the control box 37, the scarfing carriage 15 has an idler roll 57 in its forward part for supporting the bloom during scarfing as the bloom passes from the burners 35 to the exit mill roll table 13. Below the level of the idler roll 57, the carriage has forward support wheels (not shown).

The motivation of the carriage and its buggy roll train 33 is provided by carriage motor 61 which drives a pinion 63 through a suitable reduction gearing 64. The pinion 63 meshes with rack 65 (see Figure 1) which is anchored to the foundation. The motor 61 has control devices, hereinafter functionally identified, and is so constructed and arranged as to rapidly move the carriage in either direction and to rapidly brake the carriage by magnetic circuits. Such a motor and its controls are described in "Magnetic Control of Industrial Motors" by G. W. Heumann (1947). It is sufficient for an understanding of the instant apparatus to know that the motor and its controls cause the carriage to move forwardly and rearwardly quite rapidly after energization and that rapid braking is effected when the carriage is moving in either direction.

In the rear part of the carriage 15, there is a pair of supporting wheels 67 which is mounted interiorly on a pair of lower horizontal structural members 69 which also support the forward pair of wheels, above mentioned. Both sets of wheels ride on the track 29. The forward set of wheels is rotatably mounted on the same horizontal axle 71 as is the carriage drive pinion 63. The motor's reduction gearing 64 drives a spur gear (not shown) mounted at the center of the axle 71 which in turn transmits power to the drive pinion, meshing with rack 65 exteriorly of the left forward support wheel.

Referring again to the rear pair of wheels 67 of the carriage, it should be noted that this pair of wheels and its axle support the forward part of the first roll buggy, interiorly of member 69. Seven other roll buggies are successively attached so that adjacent ends of the buggies are mounted on a common axle and common wheels, outwardly or inwardly of the preceding buggy as the case may be. This construction easily gives vertical flexibility and so provides for the roll buggies entering and leaving the tunnel 31.

Above the rear wheels 67 of the carriage, another idler roll 73 is provided, adjacent the lower burner 35. This roll 73 provides the vertical opposition for the upper one of the three clamps 75 which grasp and position the forward end of the bloom as it leaves the entry mill roll table 11, with the result that the burners 35 can be rapidly positioned for beginning the preheating since the burners will only require moving a relatively short distance. Clamps 75 also provide the means whereby the bloom is suitably moved to the desurfacing position of the carriage. Suitable solenoid motors 76 are provided for operating the normally-open clamps 75 which are constructed so as quickly to close and to retract the clamp heads. The scarfing carriage 15 also has a smoke hood 19, abovementioned, for channeling the smoke to an exhaust system (not shown) which mates with the top of the smoke hood 19 when the scarfing carriage is in scarfing position. It is to be noted that each roll buggy of train 33 has its roll individually driven so that at the time desurfacing begins the rolls will transmit some longitudinal thrust to the bloom which incidentally will have an appreciable momentum. The various electrical connections in, and on, the carriage and its train of roll buggies have been omitted in the interests of clarity and since they would be obvious, in view of the electrical block diagram in Figure 5, to one skilled in the art.

Figure 3:
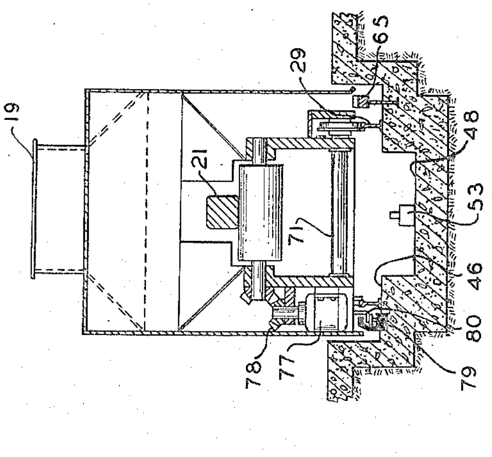
Fig. 3 is a cross sectional showing of a roll buggy which is riding on the horizontal portion of the track which is located in the scarfing zone.

The drive construction of the buggy rolls 33 and other features of the installation can be ascertained by reference to Figure 3. Thus it can be seen that the motor 77 of each roll buggy rotates the respective roll through suitable gearing 78. Another feature disclosed in Figure 3 is the basic means for transmitting current to the control box 37 of the carriage 15. This is accomplished by the guarded current carrying rail 79 and current contact shoe 80 which depends from the carriage and contacts the current carrying rail and connects with electrical circuits (not shown) on the carriage. It is to be understood that shoe 80 has been added to Fig. 3 for illustration since it actually is forward of the buggies. The ledge 46 and the cycle reset switch 53, above-mentioned, as well as a cross-section of the rack 65 also are shown in this figure. The trough 48 in the foundation which accommodates the carriage motor 61 also appears in this cross-sectional view.

Figure 5:
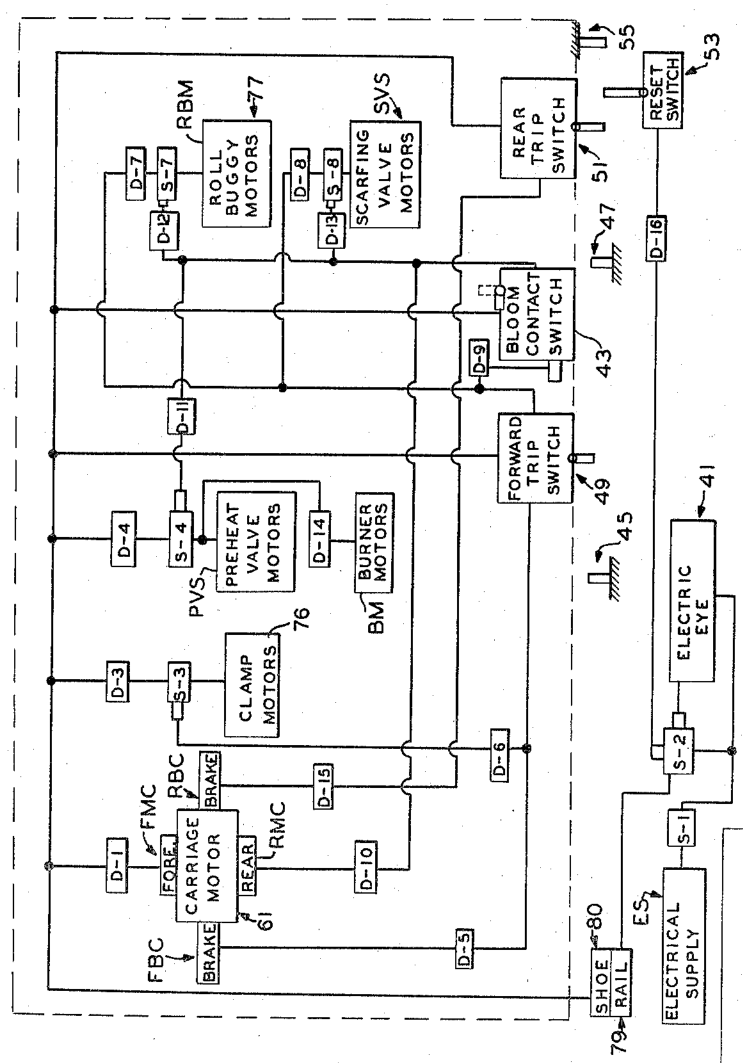
Fig. 5 is a block form diagram of the controls and controlled apparatus which provide the automatic cycle.
Figure 4:
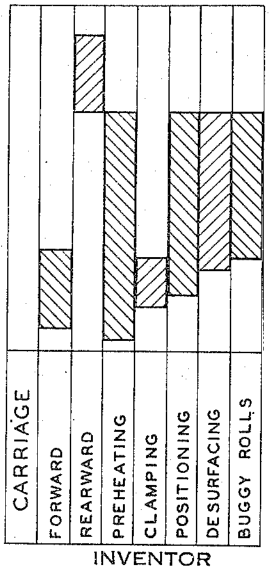
Fig. 4 is a chart showing various process steps and apparatus movement, in approximate relation, which occur during operation.

Before a description is made of the details of the automatic control cycle shown in Fig. 5, it is believed that a brief description of the basic functions is appropriate. The entire operation can be visualized by reference to Figure 4 which is a chart showing approximately the various end results relative to the movement of the scarfing machine. Thus, slightly before the carriage starts to move forward (Carriage, Forward) the preheating flames (Preheating) are initiated and brought to normal operating conditions. In order that the forward momentum of the bloom can be taken advantage of and so no significant retardation of the bloom's forward motion occurs with a consequent adverse effect on the scarfing machine, the clamps (Clamping) are actuated to grasp the bloom shortly after the carriage has been moving forward but only after the carriage has acquired the approximate speed of the bloom. Shortly after the clamping occurs, the burners are moved into proper relation to the leading part of the bloom. This is indicated by the term "Positioning."

Before the carriage is braked to the desurfacing position and even before any appreciable slow-down of the carriage is effected, the desurfacing jets (Desurfacing) are initiated and then some desurfacing is effected by releasing the clamps and starting the roll buggy rolls (Buggy Rolls). Soon thereafter, the carriage is stopped and desurfacing continues. In this manner, the bloom continues its forward motion and only a relatively small longitudinal thrust need be exerted by the buggy rolls. After desurfacing, the buggy rolls, the preheat valves, and scarfing valves are turned off simultaneously with the beginning of the rearward motion of the carriage (Carriage, Rearward). It is to be noted that the "preheating" which occurs during scarfing or desurfacing is the conventional "lead" heating which occurs during oxygen impingement. The scarfing machine continues its rearward movement and then stops at its starting position so that it will be in position to scarf the next one in the succession of blooms passing through the mill.

The automatic control system and the controlled apparatus are shown in block diagram form in Figure 5. All of the control devices and the controlled devices are of conventional adjustable construction and design so that a detailed description thereof is not necessary. Unless otherwise noted or unless it is obvious from the foregoing description, all control items are in the control box 37 in the carriage 15. The grounding of the power and control circuits (not shown) is basically similar to the well-known trolley car circuit in which the ground connections lead to the supporting track. The complete electrical circuiting has not been shown in the interests of clarity in presenting the instant invention and since this circuit would be obvious to one skilled in the art from the Figure 5 block diagram and the rest of the disclosure. It is to be understood that the various motors, control devices, other items and circuits are suitably protected from the adverse effects encountered in scarfing and particularly in the installation herein disclosed.

In Figure 5, the scarfing machine or carriage is indicated by the dashed-line rectangular outline. The electrical supply ES, which is suitable for the various motors, solenoids, and controls, since they are selected to be operable from a common single electrical power source, is manually controlled by switch S–1 which is mounted on a suitable control panel (not shown). The closing of switch S–1 puts the entire scarfing installation on an automatic cycle since it energizes the electric eye 41 which, in turn, initiates the first step of the cycle. Thus, when a bloom intercepts a light beam directed at the photo electric cell device, this control item 41 closes and locks-in switch S–2 which is normally open and is mounted on the control panel above-mentioned. The closing of switch S–2 completes a circuit to the rail 79 and the shoe 80 in contact therewith. The forward start-up of the carriage motor 61 is suitably regulated through time delay relay D–1 which controls the fore motor control FMC. The energization of the clamp motors 76, the preheat valve solenoids PVS and the burner motors BM is regulated respectively, to give the operation suggested by Figure 4, by time delay relays D–3, D–4 and D–14. Thus, when the carriage is moving at about the same speed as the bloom, the bloom will be grasped by the clamps and the burners will be positioned properly in respect to the blooms. The burners also will have their preheat flames properly functioning at this point. The solenoid switches S–3 and S–4 in the circuits to the clamps, preheat valve motors and burner motors are normally closed. De-energization of the clamp motors 76, preheat valve solenoids PVS and burner motors BM is effected when the respective switch solenoids are energized at times hereinafter set forth.

The next control stage occurs when the fore trip switch 49 is urged rearwardly by fore tripper 45 when the carriage 15 moves forwardly over the location of fore tripper 45. Several devices are energized or de-energized in order to effect the scarfing operation above-described by fore trip switch 49. Thus, the carriage motor 61 is braked by its fore brake control FBC in a regulated manner due to time delay relay D–5. The clamp motors 76 are de-energized by having normally-closed switch S–3 opened due to energization of the solenoid of switch S–3 in a regulated manner by time delay relay D–6. Other results are that the buggy roll motors 77 are energized by current which is controlled by time delay relay D–7 and passes through normally-closed, solenoid-actuated switch S–7; and that the scarfing valve motors or solenoids SVS are energized by current which is controlled by time delay relay D–8 and passes through normally-closed solenoid-actuated switch S–8. The remaining effect caused by actuation of the fore trip switch 49, as the carriage moves forwardly, is the setting of the bloom contact switch 43 through time delay relay D–9. This setting is effected by energization of the solenoid device of the bloom contact switch 43. This solenoid causes a normally-horizontally-disposed lever to be actuated so that it tends to assume a vertical position. It is restrained from assuming this position by the bloom passing over it. When this lever is able to assume a vertical position after the scarfed bloom passes the lever, the bloom contact switch 43 is closed and another train of actuations occurs.

The bloom contact switch 43, when closed, causes through time delay relay D–10, the rear motor control RMC to function so that the carriage motor 61 operates to move the scarfing machine 15 rearwardly, back towards its starting position. The closing of the bloom contact switch 43 also affects four other items, namely, the burner motors, the preheat valves, the roll buggy rolls, and the scarfing valves. Thus, through time delay relays D–11, D–12 and D–13, the closing of the bloom contact switch 43 causes respectively the normally-closed solenoid switches S–4, S–7 and S–8 to open and hence to de-energize, respectively, the burner motors BM, the preheat valve solenoids PVS, the roll buggy motors RBM, and the scarfing valve solenoids SVS.

The final stage of the automatic cycle will occur when the carriage 15, as it moves rearwardly, has its rear trip switch 51 actuated by rear tripper 47 and thereafter the cycle reset switch 53 is operated by the carriage tripper 55. The first phase of this final stage is effected by the closing of rear trip switch 51 which, through time delay relay D–15 causes the rear brake control RBC to brake the carriage motor 61 and hence stop the scarfing machine 15. The second phase occurs, in point of time, after the cycle reset switch 53 is closed. This switch is closed, of course, before the carriage stops. Through time delay relay D–16 in the control panel (not shown), the closing of switch 53 functions so that the cycle switch S–2 is unlocked and opened after the carriage stops. Thus, the electric eye device 41 is able to close S–2 when the next, unscarfed bloom moves on the entry mill roll table 11. Since the cycle switch S–2 interrupts all power to the scarfing machine 15, the solenoid switches S–3, S–4, S–7 and S–8 and solenoid of the bloom contact switch 43 will be de-energized and these items will be ready for the next cycle.

It is to be noted that the fore trip switch 49 will be opened or reset when it passes in a rearward direction over the fore tripper 45. In an analogous manner, the rear trip switch 51 will be opened or reset when it passes forwardly over rear tripper 47. The cycle reset switch 53 will also be reset when the carriage tripper 55 moves forwardly.

From the foregoing it is apparent that a bloom is preheated and desurfaced without stopping the forward movement of the bloom in any appreciable degree. The above-described automatic cycle control system effects the details of this mode of treatment in cooperation with the other previously-described apparatus in a manner which is believed to be obvious to one skilled in the art, especially in view of the Figure 4 chart. Thus, the unscarfed bloom, moving on the entry mill roll table at a predetermined speed, actuates the photo electric cell 41 which, in turn through switch S–2 and relay D–1, causes the carriage to move rapidly forward due to the carriage's drive pinion 63 meshing in rack 65. This rapid start-up occurs in a relatively short distance and is such that the carriage's speed is substantially that of the bloom. At that point, the preheating flames are fully functioning since having been initiated suitably earlier through relay D–4. Also at that point the clamps 75 will grasp the bloom and then the burners 35 will move into proper relation to the surfaces of the bloom. The clamps 75 position the leading end of the bloom close to the burners so that rapid scarfing positioning of the burners can be effected with the result that the preheating step of increasing the temperature of all four of the leading end surfaces to the required kindling temperature can be done more rapidly. As the carriage moves through the scarfing zone to almost the desurfacing position, the desired preheating is effected and the remainder of the bloom is supported by the train of roll buggies which are pulled from the tunnel by the scarfing carriage. As above-mentioned, this forward movement of the carriage will properly set up the reset switch 53 and the rear trip switch 51 since switch 53 will be hit by the carriage tripper 55 and switch 51 on the carriage will hit rear tripper 47. The fore trip switch 49 will have been opened by the prior cycle so that it is ready for closing by fore tripper 45 during forward movement. Bloom contact switch 43 will also have been opened during prior cycle and its contact lever will be in horizontal position.

As the carriage approaches its desurfacing position, the fore tripper 45 will close fore trip switch 49; and, as a consequence, the flow of desurfacing oxygen will be initiated. Slightly thereafter, scarfing will commence and the buggy rolls will apply a forward thrust to the bloom at the moment when the clamps are retracted. Also the braking of the carriage will start. The sequence effected by the fore trip switch 49 can be suitably regulated by adjusting the relays D–7, D–8, D–6 and D–5, to give the described operation. The fore trip switch 49 also will effect in a delayed manner the setting of bloom contact switch 43 so that its lever will be urged upwardly against the lower surface of the bloom after the front part of the bloom passes the scarfing burners and moves over the lever.

Next, the scarfing machine will stop in the desurfacing position and the bloom will be completely desurfaced as it moves by the burners 35. During this scarfing, the buggy rolls will continue to urge the bloom forward and the lever of the bloom contact switch 43 will be restrained from assuming its vertical position, at which position this switch would be closed by the lower surface of the bloom.

After the bloom is scarfed and the rear end of the bloom has moved past bloom contact switch 43 so that this switch is closed by its lever moving to its vertical position, the carriage motor 61 will be actuated so as to move the carriage rearwardly, the roll buggy motors will be turned off, and the preheat valve motors, the burner motors, and the scarfing valve motors will be de-energized so that the valves are closed and the burners are retracted. The carriage will move rearwardly, pushing its train of roll buggies into the tunnel, until the lever of the rear trip switch 51 is pushed forwardly by rear tripper 47 so that the switch 51 is closed. The closing of switch 51 causes the carriage to be braked to its starting position. Before this position is reached, however, the carriage tripper will operate the reset switch 53 which, in turn after a suitable delay due to relay D–16, will unlock and open the cycle switch S–2 after the carriage has stopped so that it can be closed by electric eye 41 when the next unscarfed bloom actuates electric eye 41.

It is to be noted that, during the above-described operation, preheating is effected while each of the blooms or ferrous metal bodies is moving substantially at the mill speed, which is a predetermined high speed. After this preheating, which is sufficient to permit initiation of desurfacing by conventional oxygen jets, it is evident that rapid relative longitudinal movement between each of the metal bodies and the oxygen jets is effected. It is to be understood that the disclosed installation can be modified in order to provide the relative longitudinal movement in a different manner. Thus, by incorporating a forward tunnel and forward roll buggies and by suitably augmenting and modifying the controls and other items, it is possible to provide means for effecting the desurfacing with the metal body moving forward while the scarfing machine is moving rearwardly. This modification would be especially suitable for use with blooms of uniform length which are being handled at a high treatment frequency. With this operation, the rate of relative movement between the metal body and the scarfing machine would, of course, be appreciably greater.

As above suggested, by having arranged the instant scarfing installation in operative relation to conventional steel mill rolling apparatus or other processing apparatus, as indicated by the conventional conveyor rolls 11, 13 herein disclosed, it is evident that the elongated ferrous metal bodies are successively scarfed, not only without stopping but at a high speed, while in transit from one steel mill rolling apparatus or other processing apparatus to the next processing apparatus or means. It is also apparent that the bloom is moved between the two processing apparatus at some predetermined speed which will depend upon the frequency at which the blooms leave the processing apparatus. Thus, if the blooms are issued very frequently from the prior processing apparatus, the transit speed will necessarily be higher than when the blooms are issued at a lower frequency. The time which is required for preheating is, of course, the basic factor and this factor requires a correlation of speeds and scarfing zone distance.

It is to be appreciated that the instant carriage can be altered and operated so that the preheating step is effected at a speed which is greater than the speed at which the bloom is moving on the entry mill roll table by increasing the forward speed of the carriage. Similarly, the buggy rolls can be operated so as to provide a greater bloom speed during desurfacing than the bloom speed on the entry mill roll table. With these changes, the preheating and desurfacing are accomplished at speeds greater than the mill speed and hence the scarfing or thermochemical surface removing of the succession of very frequently-issued blooms which are moved thereafter at a given speed can be accomplished by giving due consideration to the time required for preheating. In some cases, it may be desirable to increase the speed of the bloom only during desurfacing.

It is to be understood that the entry mill roll table constitutes one form of conveying means for moving ferrous bodies at high speeds from a rolling mill towards a scarfing installation.

Since the preferred embodiment of the invention has been disclosed in detail, it is to be understood that modifications and changes can be made by one skilled in the art without departing from the invention as defined in the following claims.

I claim:

1. A method of scarfing the longitudinal peripheral surface of each of a succession of elongated ferrous bodies, issuing from a ferrous body processing apparatus at frequent intervals and traveling at a high speed, without stopping each of said bodies; said method comprising preheating the leading longitudinal peripheral surface portion only of each of said ferrous bodies, sufficiently to permit the initiation of desurfacing by oxygen jets, while each of said metal bodies continues moving substantially at said high speed for a predetermined relatively short distance; moving the preheating means with said leading surface portion; and then desurfacing each of said bodies with oxygen jets while maintaining the forward speed of each of said bodies and moving each of said bodies past said oxygen jets.

2. A method of scarfing the longitudinal peripheral surface of each of a succession of ferrous metal bodies, issuing from metal processing apparatus at frequent intervals and at a predetermined speed, without stopping said bodies for preheating; said method comprising preheating the leading longitudinal peripheral surface portion only of each of said ferrous metal bodies, sufficiently to permit initiation of desurfacing by oxidizing jets, while each of said metal bodies is moving forward; moving the preheating means with said leading surface portion; and then desurfacing each of said bodies with oxidizing jets while effecting relative longitudinal movement between each of said bodies and said oxidizing jets.

3. The method of longitudinally scarfing the surface of an elongated ferrous metal body without arresting the forward movement of said body; said method comprising directing preheating flames against said surface at the leading end of said body while advancing the flames with said body so that the surface is heated to kindling temperature while said body is moving; immediately thereafter directing a stream of scarfing oxygen obliquely against said surface at the leading end of said body after said end has moved forwardly from the location at which said preheating started in order to initiate scarfing; and then effecting relative longitudinal movement between said scarfing stream and the remainder of said surface of said moving elongated body whereby longitudinal scarfing of said body throughout its length occurs.

4. In the art of thermochemically desurfacing elongated ferrous metal bodies while they are in transit from one processing apparatus to the next processing apparatus in a steel mill, the method which comprises conveying each body lengthwise upon a first section of mill roll table at a predetermined speed from a processing apparatus to a scarfing zone; moving said body through said zone at a speed approaching said predetermined speed and onto a second section of mill roll table; during said moving of said body through said scarfing zone, preheating the leading-end, longitudinal surface only of said body to the kindling temperature thereof; moving the preheating means with said leading-end longitudinal surface; immediately after said preheating and during said moving of said body through said scarfing zone, directing a thermochemical desurfacing gas stream obliquely against the surface of said moving body and in a longitudinal direction whereby said body is desurfaced; and conveying said desurfaced body on said second section of mill roll table towards the next processing apparatus at substantially said predetermined speed.

5. A method of scarfing a ferrous metal body by thermochemical desurfacing means comprising moving said body at a predetermined speed towards a scarfing zone; preheating the leading portion only of said body while it is moving, at a speed approaching said predetermined speed, through said scarfing zone; moving the preheating means with said leading portion; and immediately thereafter desurfacing said body with relative longitudinal movement between the desurfacing means and said body while maintaining the speed of said body at about said predetermined speed.

6. The method of scarfing a ferrous metal body which comprises moving said body at a predetermined speed, preheating the leading edge surface portions only of said body while moving said body substantially at said speed for a predetermined period of time, moving the preheating means with said leading edge surface portions, and then thermochemically removing the surface portions of said body as said body passes a fixed location substantially at said speed whereby scarfing is accomplished without stopping the movement of said body.

7. The method of eliminating surface imperfections from an elongated ferrous body which is moved at a high speed from a rolling device comprising directing preheating flames against the surfaces of the leading end only of said ferrous body in order to heat said surfaces to ignition temperature while said body is moving a relatively short predetermined distance at high speed, moving said preheating flames with said surfaces of the leading end only of said body, and then immediately moving said body at said speed beginning with said leading end longitudinally past oxygen jets which are arranged to impinge on said surfaces whereby thermochemical removal of the longitudinal surfaces of said body is effected.

8. A scarfing installation for thermochemically removing surface imperfections from elongated ferrous metal bodies comprising an entry mill roll table having a discharge end and an exit mill roll table having an entrance end facing said discharge end, said tables being longitudinally aligned and said ends being spaced from each other so that a scarfing zone is formed between said ends, movable means positioned in said scarfing zone and adapted to reciprocate between said ends and in alignment with said tables; said movable means being adapted to move with the leading portion of each of said ferrous bodies as said portion leaves said discharge end of said entry table, said movable means including a heating device constructed and arranged to heat to ignition temperature the leading portion only of each of said ferrous bodies as said leading portion moves from said discharge end towards said entrance end of said exit table, and scarfing means in said scarfing zone for thermochemically removing surface imperfections from each of said ferrous bodies immediately after the leading end thereof is heated to ignition temperature by said heating device and as each of said bodies continues its forward movement.

9. The scarfing installation as defined in claim 8 and being further characterized in that said movable means has support means attached thereto for supporting the part of said ferrous bodies extending back from the leading portion when said leading portion is appreciably spaced from said discharge end of said entry table.

10. A scarfing apparatus for scarfing a succession of elongated ferrous metal bodies comprised of a first roller table means for supporting and moving each of said bodies at a predetermined speed, said first roller table means having a discharge end, a second roller table means for supporting and moving each of said bodies at said predetermined speed being aligned with said first roller table means and having an entrance end spaced from said discharge end of said first table means, a preheating and scarfing carriage mounted on tracks extending between said discharge end and said entrance end, said carriage being adapted to support and move at said predetermined speed each of said elongated ferrous bodies between said ends of said tables, said carriage including a preheating device adapted to preheat the entire peripheral surface of the leading portion only of each of said elongated ferrous bodies as said body is moved, positioning means on said carriage for positioning the leading portion of each of said bodies adjacent said preheating device, and scarfing means mounted on said carriage for thermochemically desurfacing the entire peripheral surface of each of said elongated ferrous bodies, said scarfing means including oxygen nozzles adapted to impinge oxygen on all portions of said peripheral surface after the peripheral surface of said leading portion is preheated.

11. The scarfing apparatus according to claim 10 and further including automatic control means mounted adjacent said first roller table means for controlling the beginning of the movement of said carriage and the beginning of the operation of said preheating device and of said positioning means when a ferrous body is moving on said first table means.

References Cited in the file of this patent

UNITED STATES PATENTS

| | | |
|---|---|---|
| 2,221,788 | Doyle | Nov. 19, 1940 |
| 2,453,019 | King | Nov. 2, 1948 |
| 2,500,245 | Doyle | Mar. 14, 1950 |

OTHER REFERENCES

"Heat Treating and Forging," January 1943, p. 44.